March 7, 1950 P. H. KRUSE ET AL 2,499,959
APPARATUS FOR FORMING PLYWOOD PANELS
Filed April 30, 1946 4 Sheets-Sheet 1
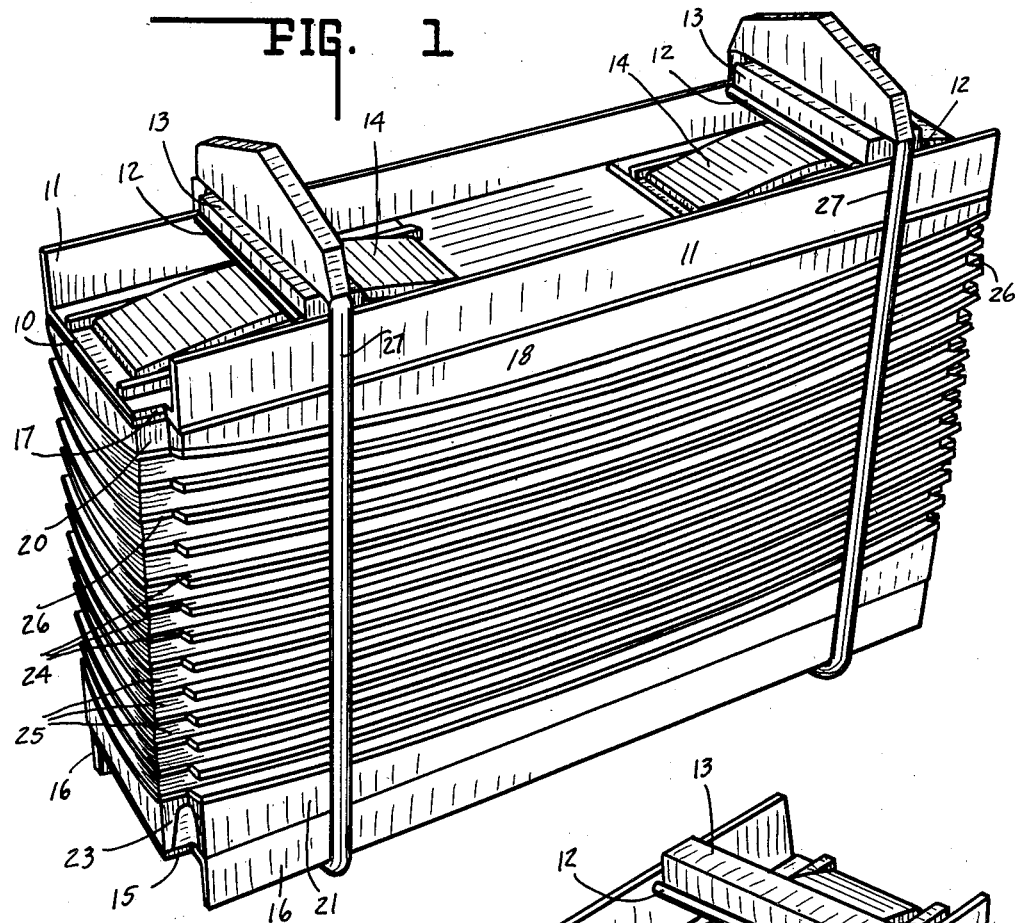
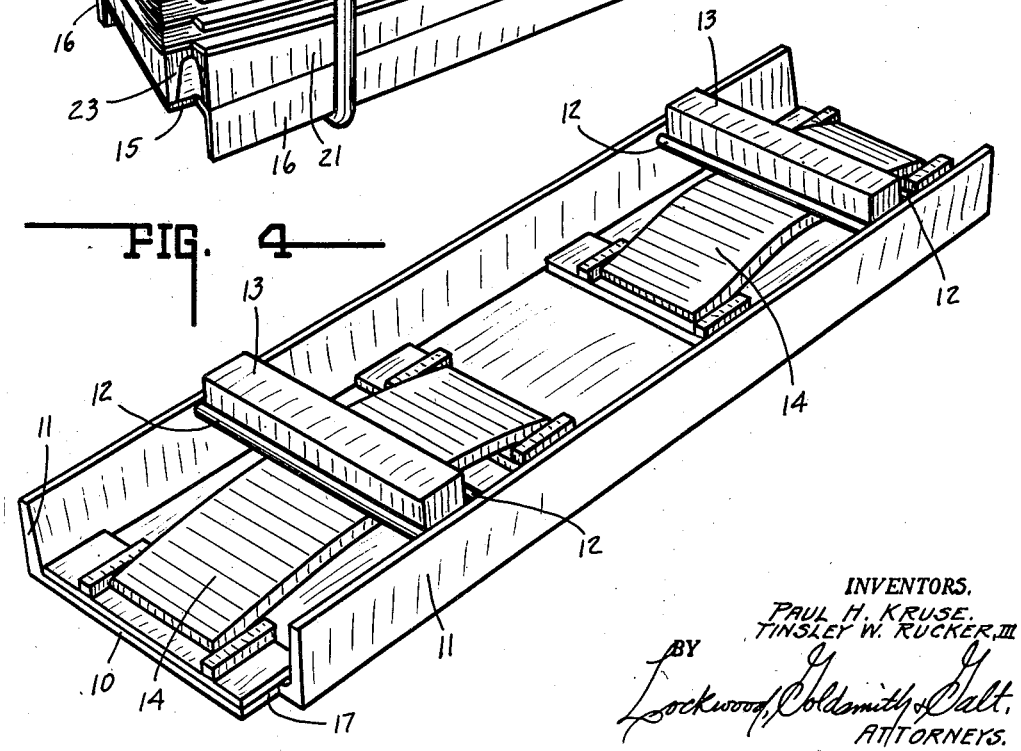
INVENTORS.
PAUL H. KRUSE.
TINSLEY W. RUCKER, III
BY
Lockwood, Goldsmith & Galt,
ATTORNEYS.

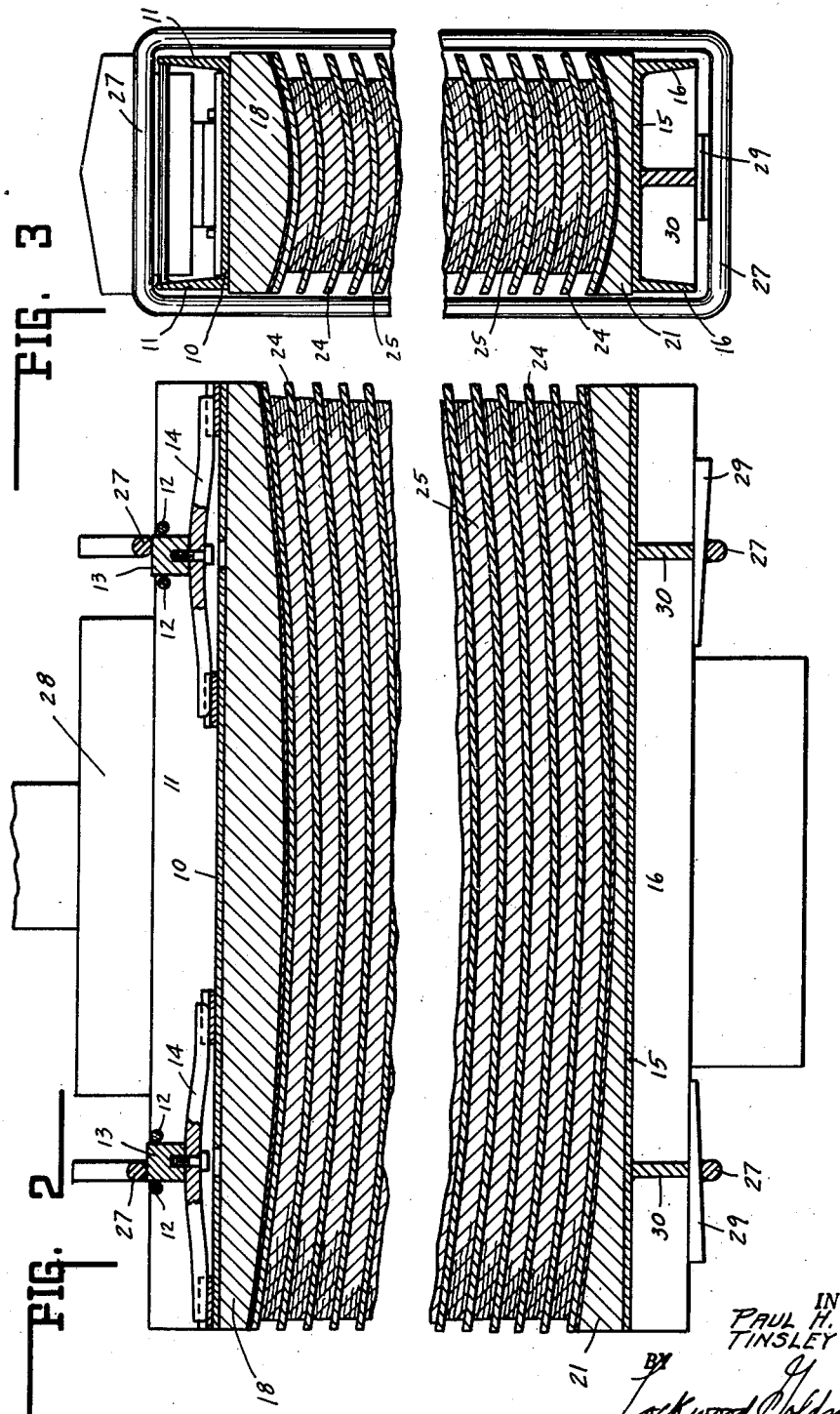

March 7, 1950 P. H. KRUSE ET AL 2,499,959
APPARATUS FOR FORMING PLYWOOD PANELS
Filed April 30, 1946 4 Sheets-Sheet 3

INVENTORS.
PAUL H. KRUSE.
TINSLEY W. RUCKER, III.
BY
Lockwood Goldsmith & Galt,
ATTORNEYS.

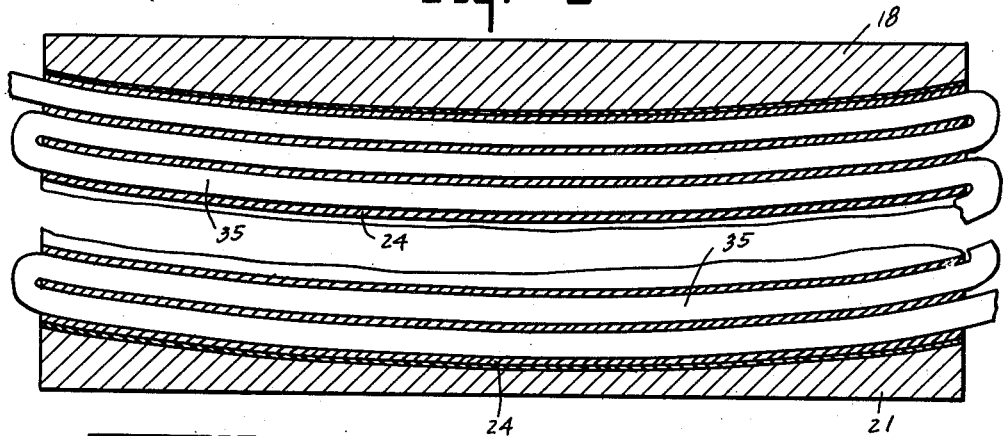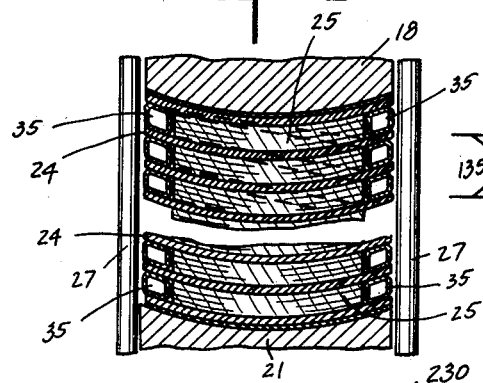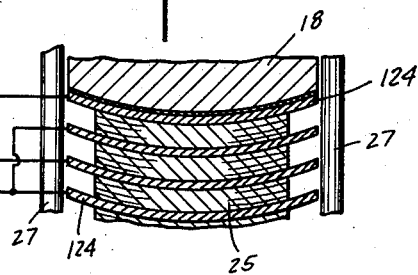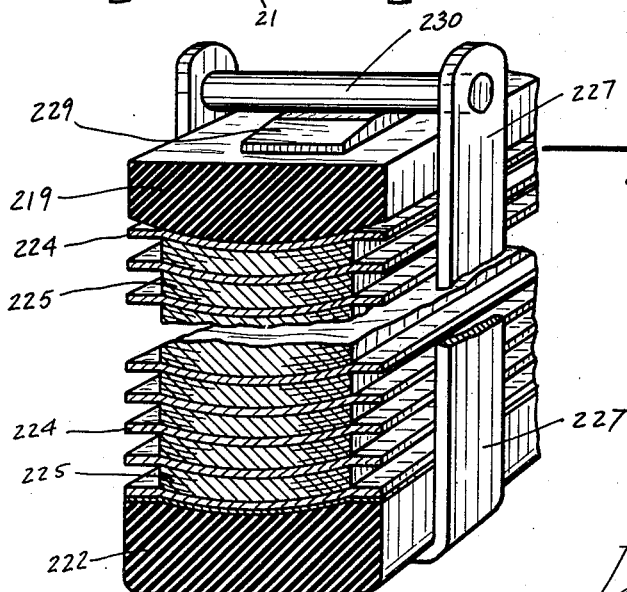

Patented Mar. 7, 1950

2,499,959

UNITED STATES PATENT OFFICE 2,499,959

APPARATUS FOR FORMING PLYWOOD PANELS

Paul H. Kruse and Tinsley W. Rucker, III, Louisville, Ky., assignors to General Plywood Corporation, Louisville, Ky., a corporation Application April 30, 1946, Serial No. 666,042

6 Claims. (Cl. 144—256)

This invention relates to apparatus for forming plywood panels, particularly plywood barrel staves usually of compound curvature, and wherein the material bonding the plies is cured simultaneously with the forming to the desired contour under application of heat and pressure.

The invention involves that character of apparatus which may be referred to as a packaging structure for packaging a large number of barrel stave blanks to be thereby pressed to the desired contour or compound curvature, and maintained under pressure while being heat treated for curing the bonding material interposed between the plies of each blank.

One feature of the invention resides in the arrangement of the packaging structure, such as to form and maintain the conformed plywood blanks under pressure in a manner to be portable and transferable into and out of a heat treating oven and during the heating period, and wherein it is provided with a series of interposed heat conducting cauls with exposed fins for transmitting heat to the interior portion of the packaging structure.

Another feature of the invention resides in the form and arrangement of the bottom and top headers in conjunction with the interposed cauls, each having corresponding notched corner portions for aligning them and the interposed blanks in complementary packaging formation.

A further feature of the invention resides in the mounting of the headers and intermediate cauls whereby they will be held under yielding compression after being assembled and subjected to pressure, and during the heat treating process of forming and bonding.

An additional feature of the invention lies in the direct heating of the stave blanks while maintained under pressure, wherein a heat transmitting element, such as steam or hot water pipes, are laid upon or coiled about the exposed heat transmitting fins of the forming cauls. Also said forming cauls may be utilized as electrodes to be connected to a source of high frequency electrical energy for inducing heat within the formed stave blanks.

The full nature of the invention will be understood from the accompanying drawings and the following description and claims:

Fig. 1 is a perspective view of the packaging structure secured under pressure.

Fig. 2 is a longitudinal section therethrough.

Fig. 3 is a transverse section therethrough.

Fig. 4 is a perspective view of the top pressure bar.

Fig. 8 is the same view of Fig. 2, showing a modified form of the invention, with parts removed.

Fig. 9 is a transverse section therethrough.

Fig. 10 is a transverse section showing the forming cauls connected to a source of high frequency electrical energy.

Fig. 11 is a transverse section through the packaging structure showing a further modified form thereof.

Figure 5:
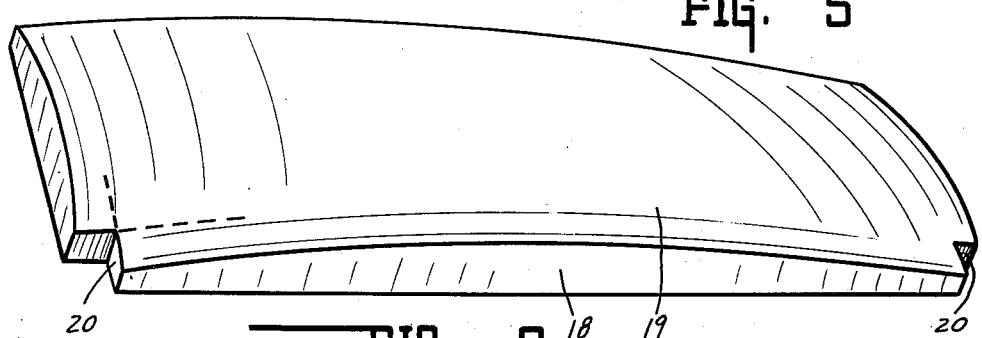
Fig. 5 is a perspective view of the top forming header in inverted position.
Figure 6:
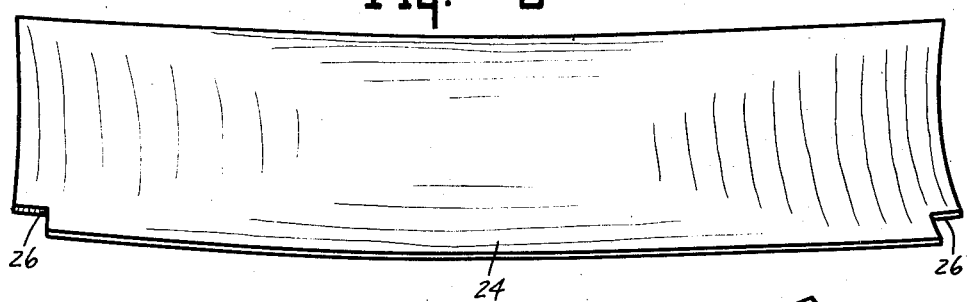
Fig. 6 is a perspective view of the series of intermediate forming cauls.

In the drawings there is shown an apparatus for forming plywood panels comprising a packaging apparatus for forming and retaining a column of plywood blanks under pressure for simultaneously bonding during heat treatment.

Said packaging structure includes a top pressure bar 10, as shown in Fig. 4, of slightly greater dimensions than the panels to be formed and of heavy structural iron reinforced by upwardly extending side flanges 11. Extending between said flanges and secured thereto there is provided a pair of spaced tie rods 12 adjacent each end thereof. Freely mounted but located between each pair of said rods there is a pressure block 13 resting upon and in engagement with a heavy plate spring 14 bearing against the pressure bar.

In alignment with and spaced below the top pressure bar there is a complementary pressure bar in the form of a platform 15 having downwardly extending reinforcing flanges 16. Each of said bars 10 and 15 is provided on one side thereof and at each end with a guiding and locating corner notch indicated at 17.

Adjacent the under side of the top pressure bar 10 there is a top forming header 18 having its lower surface indicated at 19 formed to the approximate final contour of the plywood panel or barrel stave, being herein shown as provided with a compound curvature. Said header is provided with notches 20 arranged for alignment with the corner notches 15 in the pressure bars. Adjacent the platform 15 and supported thereon there is a bottom forming header 21 having an upper surface 22 conforming in contour to the surface 19, said header being similarly provided with notched corners 23.

Intermediate said headers there is stacked a series of alternately arranged forming cauls 24 and plywood blanks 25, said cauls being provided at opposite ends with notches 26 arranged for corresponding alignment with the notches 17, 20 and 23.

Embracing each end of the top and bottom pressure bars together with the intermediate headers, cauls and blanks, there is provided a pair of strain rods 27 arranged to be looped thereabout. Said strain rods are in position to pass over and engage the spaced pressure blocks 13 adjacent each end of the packaging structure.

The plywood blanks are of a dimension slightly larger than the finished panel to be formed therefrom, such as a barrel stave, to permit of trimming to size, and may be built up of two or more plies with a suitable bonding material therebetween such as a thermo-setting type of resin, for example of phenolic resin, urea, formaldehyde, melamine or resorcinol. The lowermost blank comprising the assembled plies with the intermediate bonding material, is placed over the bottom forming header, with one of the forming cauls 24 placed over it. Succeeding blanks and cauls are stacked thereon in a manner to be interposed one between the other, alternately a blank and a caul. On top of the stack is placed the top forming header 18 upon which is rested the top pressure bar 19.

In thus bundling the stack, the end notches 17, 20, 23 and 26 are employed to align the respective pressure bars and intermediate headers and cauls relative to each other and the interposed plywood blanks. As the blanks are not notched, their side edges on one side are aligned with the side edges of the notches so as to cause a predetermined area of the cauls to extend laterally beyond the blanks to provide a series of exposed heat conducting fins. Similarly heat conducting fins of the cauls are provided on their opposite sides by reason of the blanks being cut to a correspondingly less width.

Upon the structure being built up, it is subjected to compression by any suitable means such as application of a hydraulic press indicated at 28 in Fig. 2, adapted to compress the plies and conform them in nesting relation with respect to the headers 18 and 21 and interposed cauls 24. While under pressure the strain rods 27 are slipped over opposite ends of the pressure bars 19, 15 in alignment with the respective pressure blocks 13. Said strain bars are then, while the structure is still under pressure, drawn against the pressure blocks and in turn against their respective plate springs 14 by driving home the wedges 29 between the lower portion of the respective strain rods and spacer bars 30 secured transversely of the underside of the bottom pressure bar 15 (Figs. 2 and 3).

By means of the wedges 29 the strain rods are drawn taut with the springs 14 under compression. Thereupon the compressed packaging structure is released from the applied pressure, being maintained in its compressed condition by the strain rods under tension of the springs 14. Thus compressed, the packaging structure is subjected to a heat treatment by being transported and placed in a suitable heat treating oven for such period of time as may be required to cause the bonding material to be sufficiently cured and the plywood become permanently shaped to the contour of the headers and interposed cauls. After the proper heat treatment, the packaging structure is removed and disassembled.

While in the curing oven, heated air or other heat transmitting medium, is circulated about the outwardly extending fins of the cauls, which, being of highly conductive metal, transfer the heat to the interior portions of the plywood to be absorbed thereby for reaching and curing the bonding material. It may be desirable to maintain the pressure for some time after the packaging structure is removed from the curing oven, since sufficient residual heat will be retained for continuing the curing of the bonding material for a substantial period after removal due to the mass of material. This is advantageous in not tying up the limited space of the oven, as well as producing a more thorough and even cure of the bonding material while adjustment of moisture in the formed panels is taking place to thereby develop a reasonably stress free product.

By maintaining the panels under pressure during the cooling action after removal from the oven, any steam generated by reason of pocketed moisture may be dissipated gradually so that the fibers of the wood are not ruptured or the bond damaged when the pressure is removed. Also, by gradual absorption of heat in the oven due to the mass of material, it is possible to eliminate a hazard of hot plate bonding known as "blistering," caused by the pocketing of steam or moisture which in turn flashes into steam. Due to the number of plywood blanks contained within the package, advantage is taken thereby of the averaging of variations in thicknesses due to variation in the density, texture of the wood, etc.

Figure 7:
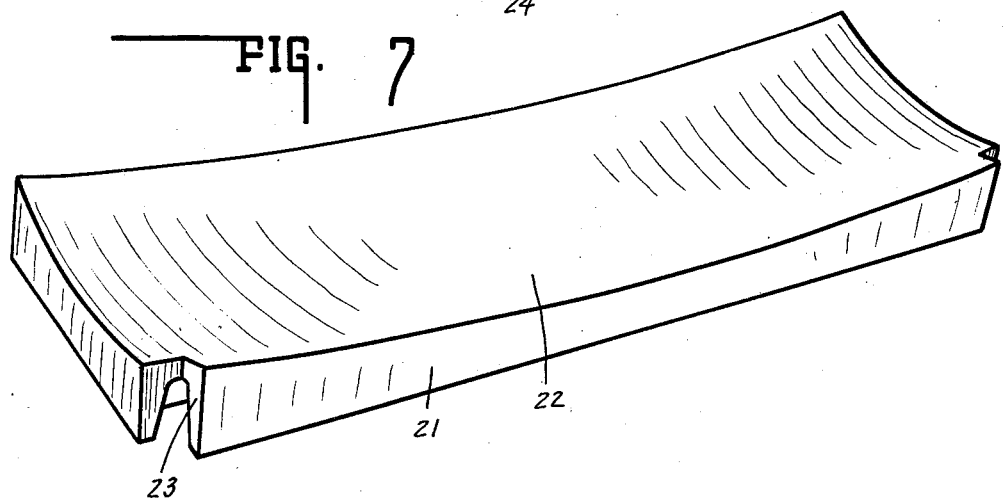
Fig. 7 is a perspective view of the bottom forming header.

In the modified forms of Figs. 7 and 8 the exposed fin portions of the interposed cauls 24 may be provided with a direct heating system such as the steam and hot water coils 35 connected in series or individually with a suitable source. Thus, instead of maintaining the packaging structure in a furnace or air conditioning unit, the direct heat transmitting coils may be merely connected with a heat source.

Similarly, as shown in Fig. 9, the intermediate cauls may comprise electrode plates 124 connected with a source of high frequency electrical energy in the manner disclosed in Patent No. 1,900,573, granted March 7, 1943, to E. D. McArthur, for Electrical heating apparatus, and as further disclosed in Reissue Letters Patent No. 22,301, filed by Earl C. Pitman, reissued April 13, 1943, for Cementing process. By connecting the cauls 124 to a source of high frequency indicated at 135 as disclosed in said Letters Patent, heat may be developed in the thermoplastic adhesive between the formed plywood layers for rapid curing thereof, thus joining the layers or laminations rigidly together in their formed contour.

In some forms of packaging structure it may not be essential economically to form the required contour to rigid metal headers, such as the headers 19 and 22 above described. In the modified form of Fig. 10 headers 219 and 222 are of a compressible material, such as rubber, which will resist but yield to the contour of the interposed metal cauls 224. Said cauls are formed to the desired contour of the barrel stave blanks 25 to be interposed therebetween. In this arrangement the strain rods 227 are in the form of wide straps which embrace the header blocks of rubber and tie them together under pressure in the manner above described. Said strain rods or straps are shown as U-shaped, having their upper ends connected by a pressure rod 230. When the package is compressed, the wedges 229 are inserted between the pressure rods 230 and the upper surface of the compressible header 219.

The invention claimed is:

1. In apparatus for forming plywood panels, a packaging structure comprising top and bottom pressure bars substantially coextensive with the panels to be formed, male and female forming headers mounted adjacent said pressure bars having opposed surfaces of a prescribed form, a series of heat transmitting cauls conforming in contour to and interposed between said headers, said cauls being arranged with interposed plywood blanks to be formed and bonded therebetween, spring members on one of said pressure bars, a pair of strain rods seatable over said spring members, and expanding elements engageable with the other of said pressure bars and said rods for yieldingly securing said bars when compressed to maintain said structure under static applied pressure during the forming and bonding of the plywood.

2. In apparatus for forming plywood panels, a packaging structure comprising top and bottom pressure bars substantially coextensive with the panels to be formed, male and female forming headers mounted adjacent said pressure bars having opposed surfaces of a prescribed form, a series of heat transmitting cauls conforming in contour to and interposed between said headers, said cauls being arranged with interposed plywood blanks to be formed and bonded therebetween, spring members carried by one of said pressure bars, wedging members carried by the other of said pressure bars, and a pair of strain rods seatable over said spring members and wedging members for adjustably and yieldingly securing said pressure bars under static applied pressure during the forming and bonding of the plywood.

3. In apparatus for forming plywood panels, a packaging structure comprising top and bottom pressure bars substantially coextensive with the panel to be formed, said pressure bars each provided with reinforcing side flanges and transverse pressure blocks therebetween said pressure blocks being rigidly secured to one of said pressure bars and movably mounted relative to the other of said pressure bars, transverse tie rods on said last-mentioned pressure bar for locating and guiding the movement of said last-mentioned pressure blocks, male and female forming headers mounted adjacent said pressure bars having opposed surfaces of a prescribed form, a series of heat transmitting cauls conforming in contour to and interposed between said headers, said cauls being arranged with interposed plywood blanks to be formed and bonded therebetween, a pressure spring interposed between said movable pressure blocks and their pressure bar, wedges in engagement and adjustable with said fixed pressure blocks, and a pair of strain rods connecting said pressure bars through said springs and wedges respectively when said structure is compressed for maintaining said structure under static applied pressure during the forming and bonding of the plywood.

4. In apparatus for forming plywood panels, a packaging structure comprising top and bottom pressure bars substantially coextensive with the panel to be formed, said pressure bars each provided with reinforcing side flanges and transverse pressure blocks therebetween, said pressure blocks being rigidly secured to one of said pressure bars and movably mounted relative to the other of said pressure bars, transverse tie rods on said last-mentioned pressure bar for locating and guiding the movement of said last-mentioned pressure blocks, male and female forming headers mounted adjacent said pressure bars having opposed surfaces of a prescribed form, a series of heat transmitting cauls conforming in contour to and interposed between said headers, said cauls being arranged with interposed plywood blanks to be formed and bonded therebetween, a pressure spring interposed between said movable pressure blocks and their pressure bar, wedges in engagement and adjustable with said fixed pressure blocks, and a pair of looped contiguous strain rods slidably mounted upon the ends of said pressure bars for adjustable and yielding engagement with said wedges and pressure blocks for maintaining said structure under static applied pressure when compressed for forming and bonding of the plywood.

5. In apparatus for forming plywood panels, a packaging structure comprising top and bottom channel bars substantially coextensive with the panels to be formed, male and female forming headers seated against said channel bars respectively and having opposed surfaces of a prescribed form, a series of heat transmitting cauls conforming in contour to and interposed between said headers, said cauls being arranged with interposed plywood blanks to be formed and bonded therebetween, a notched shoulder provided on each of said bars, headers and cauls at opposite corner portions thereof respectively to provide shouldered guides for locating them in alignment with said plywood blanks, said blanks being thereby located inwardly of said cauls for exposing fin-like projecting and heat transmitting surfaces along said cauls, compression springs seated on one of said bars, a pair of strain rods extending about said bars when said structure is compressed in bearing engagement with said springs, and wedges engageable between the other of said pressure bars and strain rods for rendering said bars taut, whereby said structure will thereby be maintained under static applied pressure during the forming and bonding of the plywood.

6. In apparatus for forming plywood panels, a packaging structure comprising top and bottom forming headers substantially coextensive with the panels to be formed with their opposed surfaces of a prescribed contour, a series of heat transmitting cauls conforming in contour to and interposed between said headers, said cauls being arranged with interposed plywood blanks to be formed and bonded therebetween, the lateral edges of said cauls extending outwardly beyond said blanks to provide exposed fins for conducting heat to the interior portions thereof for transmittal to the interior of said blanks, means for gripping said headers upon compression of said structure for maintaining them under static or applied pressure during the forming and bonding of the plywood, and a series of tubes mounted and carried on said fins for conducting a heating medium therethrough for heat transfer to the interposed plywood blanks.

PAUL H. KRUSE.
TINSLEY W. RUCKER, III.

REFERENCES CITED

The following references are of record in the file of this patent:

UNITED STATES PATENTS

| Number | Name | Date |
| --- | --- | --- |
| 673,409 | Nichols | May 7, 1901 |
| 921,253 | Hummel | May 11, 1909 |
| 1,016,258 | Francis | Feb. 6, 1912 |
| 1,559,575 | McMillan | Nov. 3, 1925 |
| 1,937,169 | Robinson | Nov. 28, 1933 |
| 1,945,560 | Meyercord | Feb. 6, 1934 |
| 2,183,599 | Welch | Dec. 19, 1939 |
| 2,297,120 | Wilson et al. | Sept. 29, 1942 |
| 2,307,344 | Zottu | Jan. 5, 1943 |
| 2,311,561 | Miller | Feb. 16, 1943 |
| 2,404,165 | Carver | July 16, 1946 |